United States Patent [19]
Takenaka et al.

[11] Patent Number: 5,654,945
[45] Date of Patent: Aug. 5, 1997

[54] POSITION SEARCHING SYSTEM BASED ON DETECTING LINEAR VELOCITY OF AN OPTICAL DISC

[75] Inventors: Yosihiko Takenaka; Hikaru Nakayama, both of Saitama-ken, Japan

[73] Assignee: Pioneer Electronic Corporation, Tokyo, Japan

[21] Appl. No.: 564,454

[22] Filed: Nov. 29, 1995

[30] Foreign Application Priority Data

Dec. 8, 1994 [JP] Japan .................................. 6-304797

[51] Int. Cl.$^6$ .................................................. G11B 17/22
[52] U.S. Cl. ........................ 369/32; 369/44.28; 360/78.07
[58] Field of Search ............................ 369/32, 44.28, 369/44.29, 44.35; 360/78.04, 78.06, 78.07, 77.02, 77.04, 78.09

[56] References Cited

U.S. PATENT DOCUMENTS

| | | | |
|---|---|---|---|
| 4,887,253 | 12/1989 | Tateishi | 369/32 |
| 4,931,889 | 6/1990 | Osafune | 360/78.07 |
| 5,047,999 | 9/1991 | van der Meulen | 369/32 |
| 5,216,647 | 6/1993 | Kitani | 369/32 |
| 5,218,453 | 6/1993 | Hashimoto | 369/32 |

*Primary Examiner*—Tan Dinh
*Attorney, Agent, or Firm*—Nikaido Marmelstein Murray & Oram LLP

[57] ABSTRACT

Conditions of an optical disc to be played are read out, and a linear velocity of the disc is calculated from the read out conditions. A table storing addresses of data recorded on the disc is made based on the calculated linear velocity, and a desired position on the disc is searched in accordance with the addresses stored in the table.

6 Claims, 4 Drawing Sheets

FIG.5

| CLUSTER | TRACK |
|---|---|
| 1 | 50 |
| 2 | 53 |
| 3 | 56 |
| 4 | 60 |
| 5 | 63 |
| ⋮ | ⋮ |
| ⋮ | ⋮ |
| ⋮ | ⋮ |
| ⋮ | ⋮ |
| ⋮ | ⋮ |

POSITION SEARCHING SYSTEM BASED ON DETECTING LINEAR VELOCITY OF AN OPTICAL DISC

BACKGROUND OF THE INVENTION

The present invention relates to a system for searching a position on a magneto-optical recordable disc such as a Minidisc, and more particularly to a track search system.

A compact disc (CD) is well known as a recording medium for audio signal information. There are two types of the CDS, one type of which has the diameter of 12 cm and the other type has the diameter of 8 cm. Information is recorded on the CD for 74 minutes at maximum in the form of a digital signal.

To the contrary, the Minidisc (MD) which is smaller than the CD (the diameter is 6.4 cm), which has the same reproducing time as the CD, and which is capable of writing and rewriting has become popular.

Although the MD has the small diameter, it is possible to record and reproduce data for 74 minutes by using a data compression technique. Furthermore, in the MD, a shock proof memory (DRAM) is provided for preventing an audio signal from being interrupted which is caused by a jump of a pickup.

Supposing that the capacity of the DRAM is one Mbit, while the MD is played, the DRAM becomes full in 0.9 second. When a jump of the pickup occurs, it becomes impossible for the pickup to read the data. Since the data stored in the DRAM is applied for another three seconds, if the pickup quickly returns to the position where the data are not read in three seconds and resumes the reading, there is no interruption in the audio signal fed to the loudspeaker.

The MD has a standard linear velocity determined in a range between 1.2 and 1.4 m/s which is the same as the CD.

An MD player is provided with a ROM storing data of addresses of recorded information. The data are divided into clusters which are units for recording the information. The clusters are determined based on the linear velocity. The ROM has a table storing data representing the relationship between the cluster and the track of the disc, which is used for searching a desired track.

In such an MD player, if the track search of an MD having the linear velocity of 1.2 m/s is performed in accordance with a table made based on the linear velocity of 1.4 m/s, the pickup jumps the track in accordance with the data based on the linear velocity of 1.4 m/s. Such jumping causes a large deviation of the pickup position from the desired track. The pickup must be moved to a cluster of the desired track. Accordingly, the time for searching the desired track is elongated.

SUMMARY OF THE INVENTION

An object of the present invention is to provide a system where the search time of the track may be shortened.

According to the present invention, there is provided a position searching system for an optical disc player, comprising reading means for reading conditions of an optical disc to be played, calculating means for calculating a linear velocity of the disc from the read out conditions, making means for making a table storing addresses of data recorded on the disc based on the calculated linear velocity, and searching means for searching a desired position on the disc in accordance with the addresses stored in the table.

The other objects and features of this invention will become understood from the following description with reference to the accompanying drawings.

BRIEF DESCRIPTION OF DRAWINGS

FIG. 5 is an illustration showing a table of the track search.

DETAILED DESCRIPTION OF THE PREFERRED EMBODIMENTS

Figure 1:
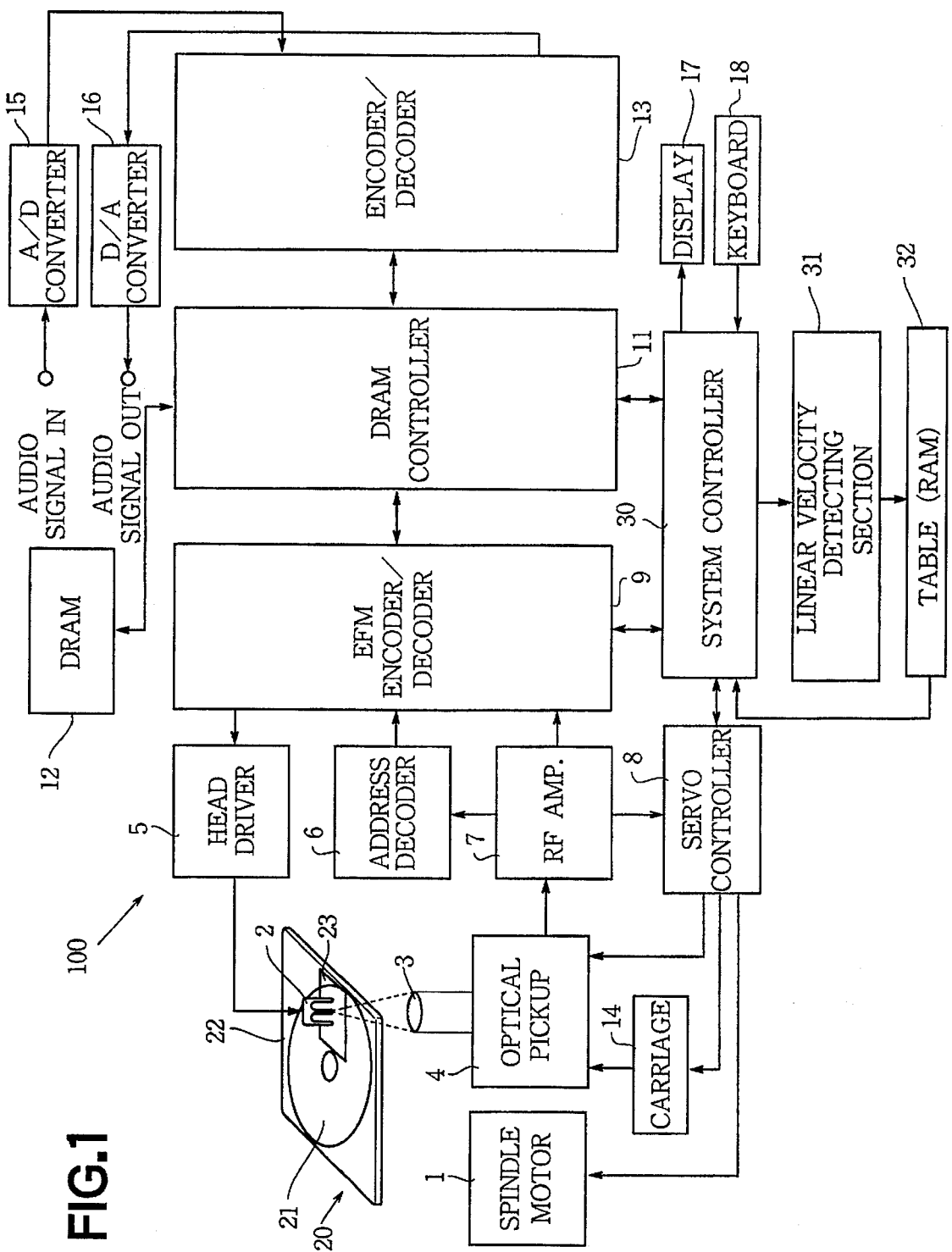
FIG. 1 is a block diagram showing a recording and reproducing system of a magneto-optical disc according to the present invention.

Referring to FIG. 1, the present invention is applied to an MD player for recording and reproducing an MD.

An MD 20 has a cartridge 22, and a magneto-optical disc 21 rotatably mounted in the cartridge for recording and reproducing data with a digital signal by an MD player 100. The cartridge 22 has a shutter 23 having an access window (not shown) on either side thereof.

The MD player 100 comprises a magnetic head 2, a head driver 5 for driving the magnetic head, a pickup 4 mounted on a carriage 14 for moving the pickup 4 in the radial direction of the disc 21, a servo controller 8 for controlling the pickup 4 and the carriage 14, and a spindle motor 1 for rotating the disc 21 in accordance with a signal from the servo controller 8. The pickup 4 has an optical system such as an objective 3.

When the MD 20 is loaded on a recording or reproducing position of the MD player 100, the shutter 23 is opened by a shutter operating device (not shown) and the magnetic head 2 and objective 3 of the pickup 4 are moved to the disc 21 for recording or reproducing the data.

A pregroove wobbled with the FM frequency is formed on the disc 21 representing data of absolute address.

When reproducing the disc 21, the disc is rotated by the spindle motor 1 at a predetermined speed. A laser beam emitted from the pickup 4 is focused on the disc through the objective 3 to irradiate a magnetic film of the disc 21. The reflected beam, a plane of polarization of which is slightly rotated by the Kerr effect, is received by the pickup 4 for reading out the data on the disc. The pickup 4 produces an RF signal which is fed to an RF amplifier 7. In the RF amplifier. 7, the RF signal is amplified to a predetermined level. An amplified RF signal is fed to an address decoder 6 which derives a wobbling frequency therefrom so as to detect an address position on the disc 21 even when data are not recorded.

The signal from the RF amplifier 7 is applied to an EFM encoder/decoder 9 where an EFM signal is derived from the RF signal. The EFM signal is stored in a DRAM 12 which is controlled by a DRAM controller 11. The stored data is fed to an encoder/decoder 13 to be expanded in order. The decoded data is converted into an analog signal by an D/A converter 16 to be output.

When recording the data on the disc, the MD player 100 further has an A/D converter 15 wherein information to be recorded on the magneto-optical disc 21, which is in the form of an analog signal, is converted into a digital data signal. The data signal is fed to the encoder/decoder 13 where the data is compressed to ⅕ in accordance with the threshold of hearing of an ear of a human being and the masking effect. The digital signal is fed to the EFM encoder/ decoder 9 which applies an encoded data to the head driver 5. The head driver 5 accordingly drives the magnetic head 2.

The magnetic film of the disc 21 is heated by the temperature in excess of the Curie temperature for modulating the magnetic field. Thus, the information is written on the disc.

The servo controller 8 and the EFM encoder/decoder 9 are controlled by a system controller 30 which is connected to a keyboard 18 for manually controlling the controller 30, and to a display 17 for indicating reproducing conditions.

A linear velocity detecting section 31 detects the linear velocity of the disc 21 during reproduction based on the decoded data of the EFM encoder/decoder 9 to rewrite data of the track corresponding to the cluster in a table 32.

Figure 5:
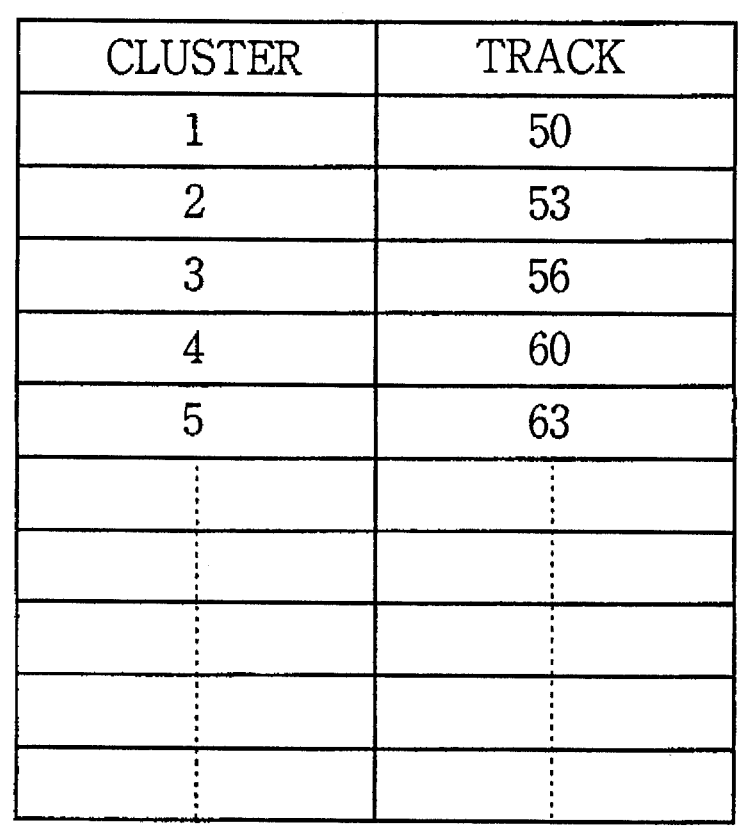

FIG. 5 shows the table of the data calculated based on the linear velocity 1.4 m/s to be stored in the ROM. A newly obtained table is stored in a RAM of the table 32.

Figure 2:
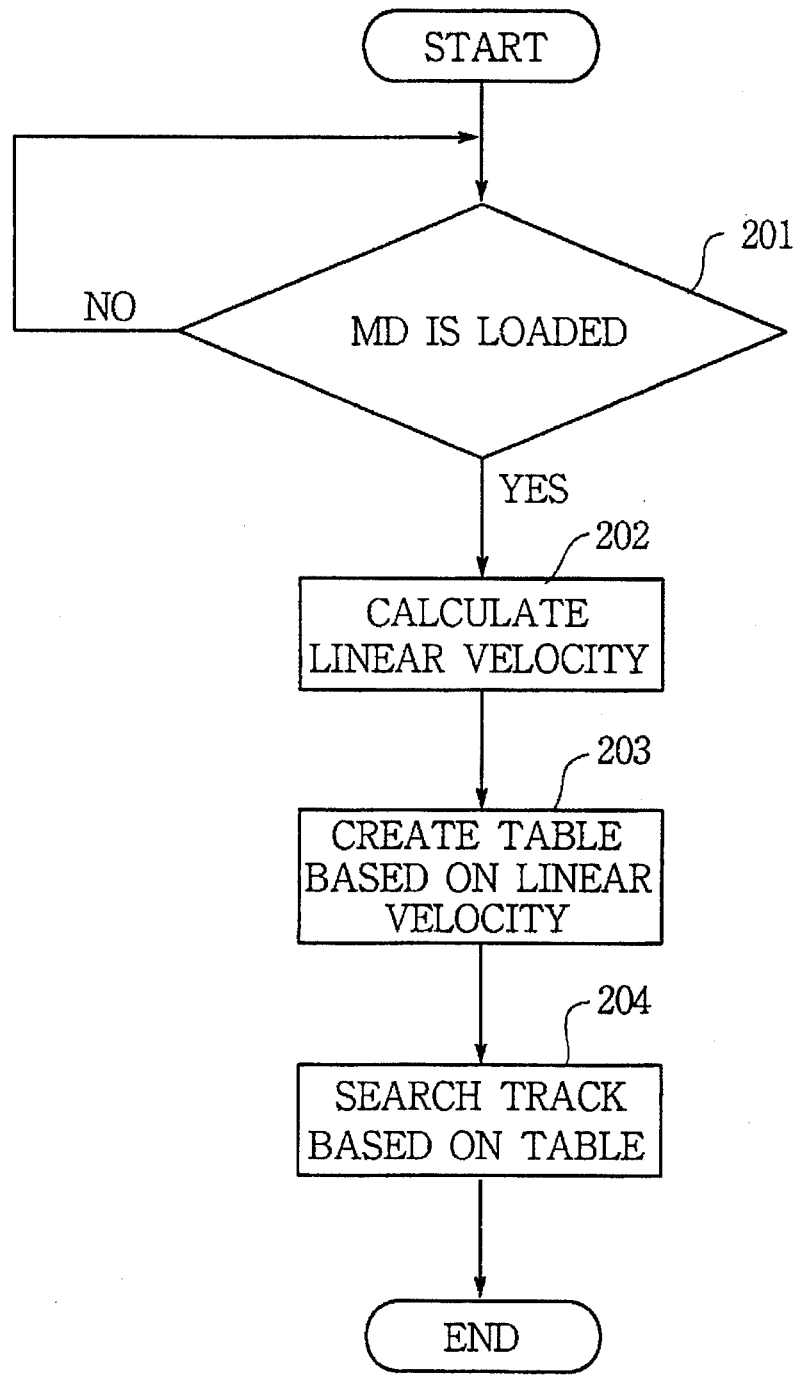
FIG. 2 is a flowchart showing an operation of a track search system of the present invention.

The operation of the track search will be described with reference to the flowchart of FIG. 2.

At a step 201, the loading of the MD 20 to the recording and reproducing system of the MD player 100 is determined. A center hub of the magneto-optical disc 21 of the MD 20 is clamped by a clamp device (not shown). As a reproduction is demanded, the disc 21 is rotated by the spindle motor 1, thereby calculating the linear velocity of the disc (step 202).

The linear velocity is calculated as follows.

In order to obtain the number of tracks, a method such as the zero cross count method is used. It is possible to determine a timing to search not only before the reproduction of the disc 21 but during the reproduction immediately before the data in the DRAM 12 is completely output.

Figure 3:
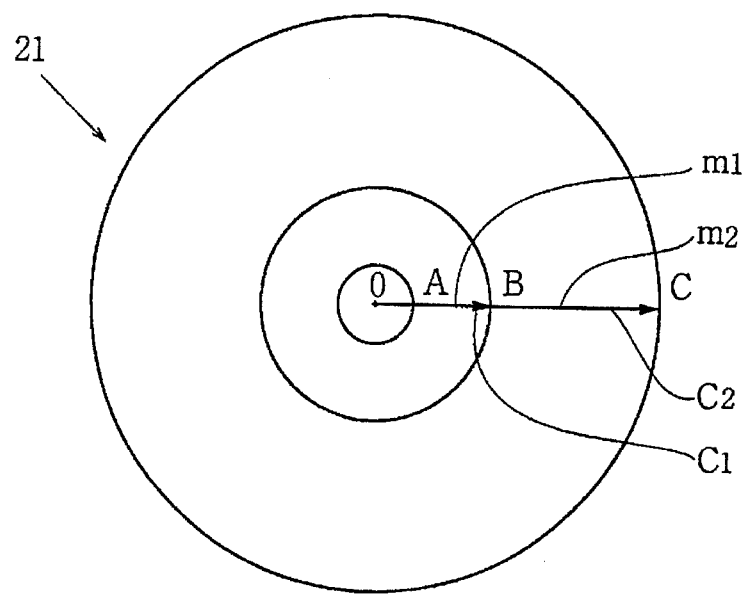
FIG. 3 is a plan view of the disc describing the track search operation of the disc.

FIG. 3 shows the disc 21 where a starting point of the search is optionally determined. In the disc, m1 is the number of tracks in an area between A and B, and m2 is the number of tracks provided in an area between B and C. These numbers are obtained by counting the number of tracks during the search. C1 is the number of clusters in the area between A and B, and C2 is the number of clusters in the area between B and C. These numbers are obtained by reading out from the disc during the search.

The area between A and B is calculated by an equation as follows.

$$\pi((m1 \cdot P) + L/2)^2 - \pi(L/2)^2$$

where P is the track pitch of 1.6 μm, and L is the diameter of the optional starting point of the search.

Furthermore, the equation can be represented by V, tc, C1 and P, where V is the linear velocity, and tc is the time of 1 cluster, namely 0.48 sec.

The time tc is calculated as follows. 1 EFM frame is 136 μsec, namely 24 byte, and 1 cluster is 36 sectors, and 1 sector is 588×4 byte, namely 2352 byte. Thus, the time tc is $$tc = (2352/24 \cdot 136) \cdot 36 \text{ sector} = 0.48 \text{ sec}$$

The linear velocity V is represented by an equation as follows.

$$V = (\pi((m1 \cdot P) + L/2)^2 - \pi(L/2)^2)/(tc \cdot C1 \cdot P) \qquad \text{①}$$

In the area between B and C, V is as follows.

$$V = (\pi((m1 + m2)P + L/2)^2 - \pi((m1 \cdot P) + L/2)^2)/(tc \cdot C2 \cdot P) \qquad \text{②}$$

The diameter L is calculated as follows by the equations ① and ②.

$$L = (P \cdot ((C1 \cdot m2) \cdot (2m1 + m2) - C2 \cdot m1^2))/(C2 \cdot m1 - C1 \cdot m2) \qquad \text{③}$$

Then, the equation ③ is substituted for the equation ①, thereby obtaining the linear velocity V.

At a step 203, the data of the track corresponding to the cluster in the table 32 is rewritten based on the obtained linear velocity V.

The table dependent on the linear velocity can be made as follows.

The number of clusters corresponding to the desired track is substituted for C1 of the equation ①. Since V, P, tc and L are known, m1 is only a variable in the equation. Thus, m1 which is the number of the tracks corresponding to C1 can be obtained from the equation ①.

Furthermore, another method for making the table will be described. m1 of the equation ① is represented by an equation ④ as follows.

$$m1 = \frac{1}{P} \left\{ \sqrt{\frac{V \cdot tc \cdot C1 \cdot P}{\pi} + \left(\frac{L}{2}\right)^2} - \left(\frac{L}{2}\right) \right\} \qquad \text{④}$$

The diameter L is set to a position where the cluster is zero. Since tc, P and π are known, m1 is obtained in dependency on V and C1. The linear velocity V is obtained by the search as aforementioned method. The number of clusters corresponding to the desired track is substituted for C1, thereby obtaining m1 which is the number of tracks corresponding to the substituted cluster. Thus, made table is stored in the table 32.

At a step 204, the track is searched based on the written table 32. Since the track is jumped without error, the time for searching the desired track is shortened.

There are other searching than the track search in the MD 20 such as searches in fast forward operation or reverse operation, and the search of digital signals recorded on a disc at intervals. Those searches can also be quickly performed. In a multi-MD player for continuously reproducing a plurality of MDs, it is preferable to provide the linear velocity and the table for each MD. However, if there are limit to capacity of stored data and cost, a table corrected by a mean of the linear velocities is provided. Thus, the track jump is not largely deflected, thereby obtaining a preferable search efficiency.

Furthermore, one of the MDs is used as a disc for a table, thereby increasing capacity of the table.

Figure 4:
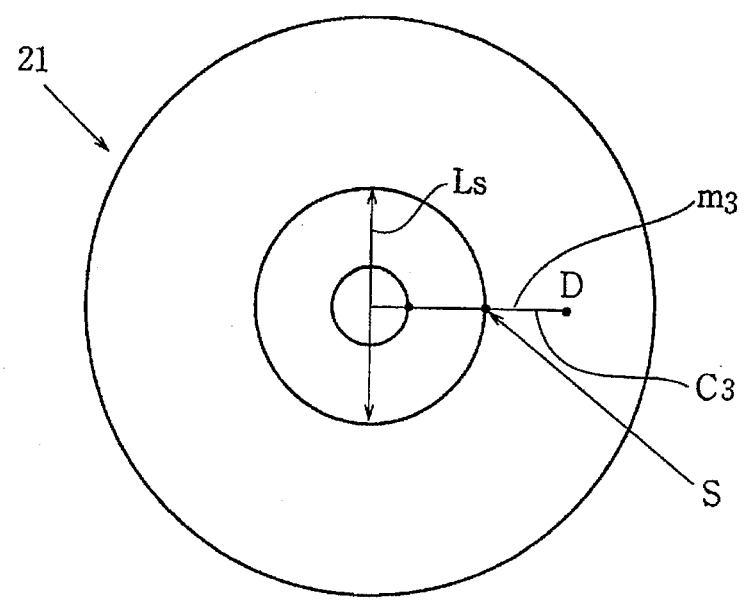
FIG. 4 is a plan view of the disc describing another operation of the disc.

FIG. 4 shows the disc 21 where a starting point of search is set at the starting point S of the program area. In such a disc, the linear velocity V a can be easily obtained. In the figure, m3 is the number of tracks provided in an area between the start point S of the program area and an optional point D, and C3 is the number of clusters in the area between S and D. LS is the diameter of a start of the address of the cluster, namely, the start point S of the program area, which is 32 mm.

The area between S and D is represented as follows.

$$\pi((m3 \cdot P) + (LS/2))^2 - \pi \cdot (LS/2)^2$$

The linear velocity V is obtained as follows.

$$V = (\pi((m3 \cdot P) + (LS/2))^2 - \pi \cdot (LS/2)^2)/(tc \cdot C3 \cdot P)$$

Although in the track search from the optional starting point L, it is necessary to search twice, only one search is performed in the track search from the determined starting point S.

The present invention is applicable to a player for the other optical discs such as CD.

In accordance with the present invention, the data of the track corresponding to the cluster stored in the table is rewritten with the linear velocity of the disc reproduced. The track is jumped with the rewritten data. Consequently, it is possible to jump without error, thereby reducing the search time.

While the presently preferred embodiments of the present invention has been shown and described, it is to be understood that these disclosures are for the purpose of illustration and that various changes and modifications may be made without departing from the scope of the invention as set forth in the appended claims.

What is claimed is:

1. A position searching system for an optical disc player, comprising: reading means for reading physical conditions on a track area of an optical disc during reproduction in order to calculate an area of the track area;

first calculating means for calculating the area of the track area based on the read out physical conditions from the reading means;

second calculating means for calculating a linear velocity of the disc based upon the calculated track area from the first calculating means;

table making means for making a table, storing addresses of data recorded on the track area, based on the calculated linear velocity from the second calculating means; and searching means for searching a desired position on the disc in accordance with the addresses stored in the table.

2. The system according to claim 1 wherein the desired position is a desired track.

3. The system according to claim 1 wherein the physical conditions are an number of tracks and a number of clusters.

4. A method for seeking a position on an optical disc, comprising the steps of;

reading physical conditions on a track area of an optical disc during reproduction in order to calculate an area of the track area;

calculating the area of the track area based upon the read out physical conditions;

calculating a linear velocity of the disc based upon the calculated area;

making a table, storing addresses of data recorded on the track area, based on the calculated linear velocity; and seeking a desired position on the disc in accordance with the addresses stored in the table.

5. The method according to claim 4 wherein the desired position is desired track.

6. The method according to claim 4 wherein the physical conditions are a number of tracks and a number of clusters.

* * * * *